Oct. 7, 1947.   M. SWAAB   2,428,475
HELICOPTER HAVING MEANS FOR ADJUSTING THE CENTER OF
GRAVITY AND THE LIFT ROTOR AXIS THEREOF
Filed April 5, 1945   2 Sheets-Sheet 1
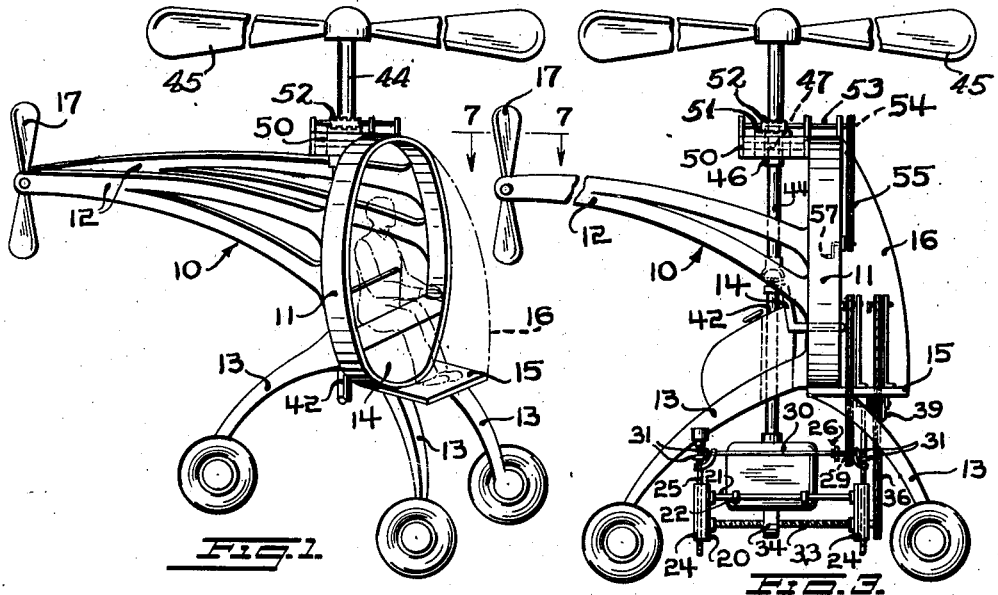
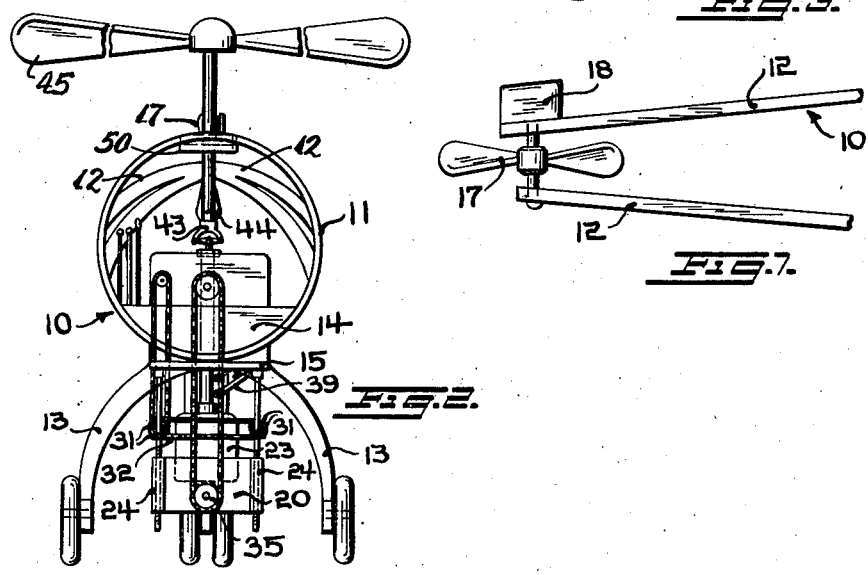
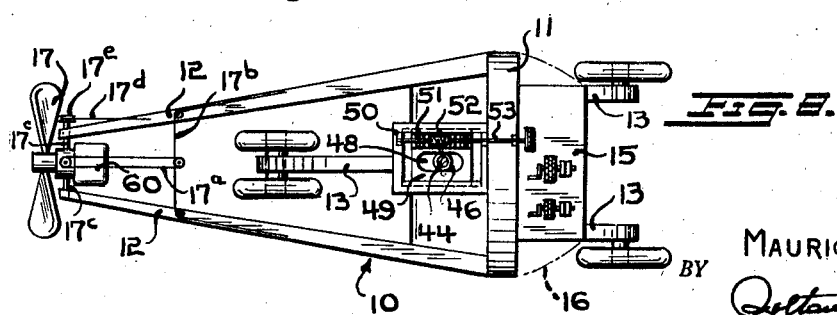
INVENTOR.
MAURICE SWAAB
BY
ATTORNEY

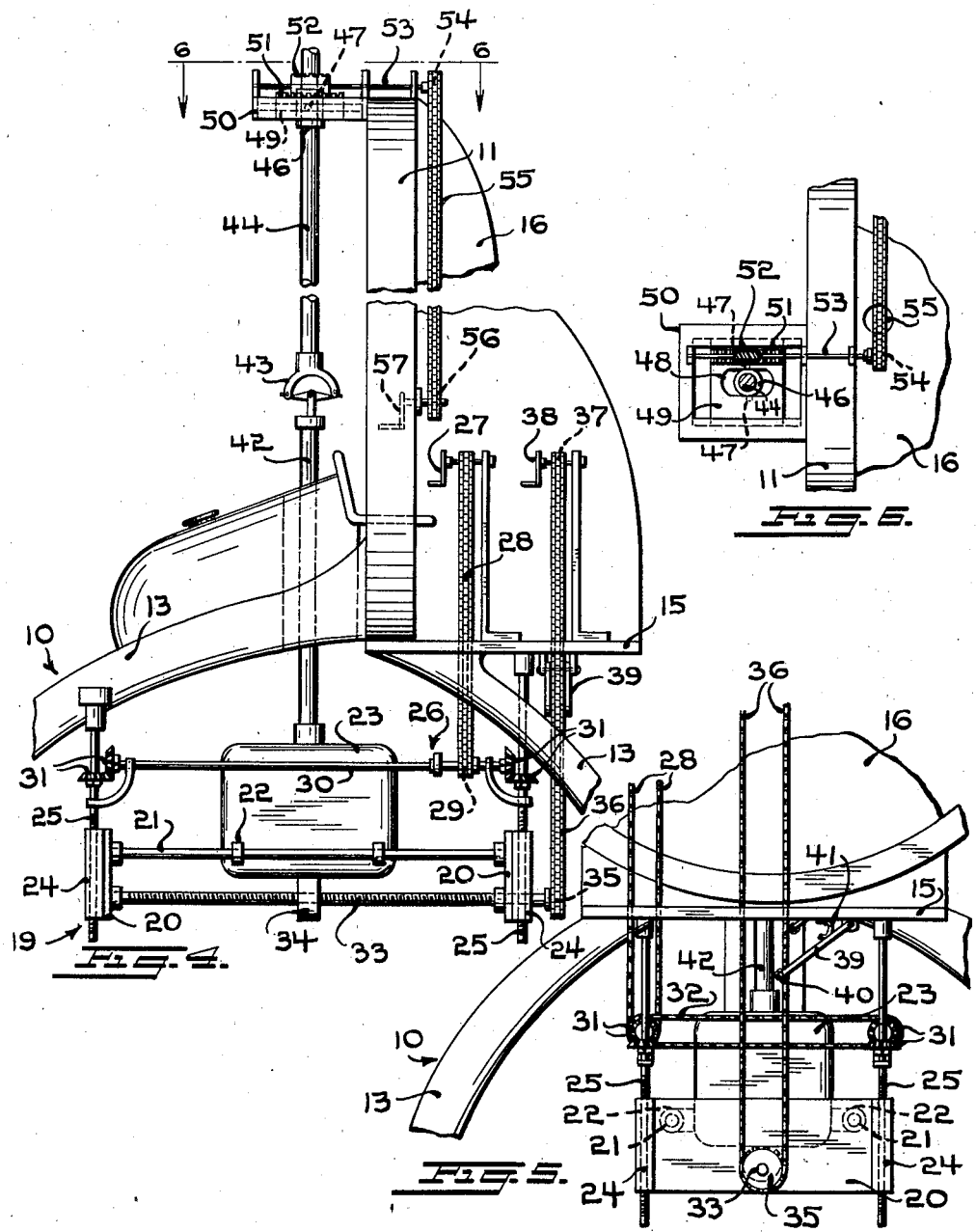

Patented Oct. 7, 1947

2,428,475

UNITED STATES PATENT OFFICE 2,428,475

HELICOPTER HAVING MEANS FOR ADJUSTING THE CENTER OF GRAVITY AND THE LIFT ROTOR AXIS THEREOF

Maurice Swaab, New York, N. Y.

Application April 5, 1945, Serial No. 586,659

4 Claims. (Cl. 244—17)

1

This invention relates to new and useful improvements in a helicopter.

More specifically, the invention proposes a new and useful improvement in a helicopter, characterized by a light, solid frame having an annular front position and rearwardly extending side arms and a bottom landing gear, with a helicopter blade arranged upon the annular front portion and which is adapted to be tilted slightly forwards to produce the forward thrust to cause the helicopter to fly in a forward direction.

Still another object of the invention proposes the provision of a steering propeller mounted upon the back face of the side arms of the frame and driven by a reversible motor in a manner to cause the helicopter to be turned to the right or the left, and to counter-act the torque of the helicopter blade.

Still another object of the invention proposes the provision of a vertical and longitudinal horizontal adjusted mounting for the motor for driving the helicopter blade and which is adapted to be shifted as outlined for controlling the angular position of the helicopter blade.

Still another object of the invention proposes the provision of an adjustable mounting for the shaft supporting the helicopter blade in a manner to permit the angular position of the blade to be varied independently of the motor adjustment.

Still further a modified form of this invention proposes providing a motor driven propeller on the back end of the side arms for assisting the helicopter blade in its forwardly inclined position in driving the helicopter forwards.

It is a further object of this invention to construct a helicopter which is simple, light and durable and which can be manufactured and sold at a reasonably low cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure.

Figure 1 is a perspective view of the frame used in constructing the helicopter.

Fig. 2 is a front elevational view of Fig. 1.

Fig. 3 is a side elevational view of the helicopter as it appears when completely constructed.

Fig. 4 is an enlarged detailed view of a portion of Fig. 3.

Fig. 5 is a front elevational view of Fig. 4.

2

Fig. 6 is an enlarged partial plan view taken on the line 6—6 of Fig. 4.

Fig. 7 is a partial plan view taken on the line 7—7 of Fig. 3.

Fig. 8 is a plan view of a helicopter constructed in accordance with a modified form of this invention.

The helicopter, in accordance with this invention comprises a frame 10 having an annular front portion 11 with rearwardly extending side arms 12 and a bottom landing gear 13. A seat 14 is mounted within the bottom portion of the annular front portion 11 and a foot rest 15 is mounted across the bottom of the annular front portion. A transparent cover 16 extends between the sides of the annular front portion and the front edges of the foot rest for enclosing the front of the annular portion 11.

A steering propeller 17 is mounted across the back ends of the side arms 12 and is adapted to be driven in one direction or the other by a reversible motor 18 for causing the helicopter to be turned to the right or the left. The pitch of the blades of the propeller may be varied by any of the controlling mechanisms generally known to those skilled in the art. Details of this latter construction are not shown in this disclosure since they form no part of this invention.

An engine support frame 19 is mounted beneath and slightly to the back of the annular front portion. This frame 19 is characterized by a pair of spaced vertical walls 20 connected with each other by means of rods 21. These rods 21 are slidably engaged by lugs 22 extending from the motor 23 for supporting the motor slide horizontally on these rods for a purpose which will become clear as this specification proceeds.

The spaced vertical walls 20 are formed on their outer faces with bosses 24 through which vertical screws 25 threadedly pass. The top ends of the screws 25 are rotatively supported upon the helicopter frame 10. A transmission means 26 is provided for rotating all of the screws 25 in one direction or the other for raising or lowering the engine support frame to similarly raise and lower the motor 23. This means is characterized by a handle 27 for turning a chain 28 which engages a sprocket 29 mounted on shaft 30. This shaft 30 is rotatively supported between a pair of the vertical screws 25 and extends parallel to similar rotatively supported shaft mounted between the other pair of screws 25. Beveled gears 31 are provided between the ends of the shafts 30 and their respective screws 25. A sprocket chain 32 extends between the shafts 30 for communicating rotations of the shaft 30 having the sprocket 29 to the other shaft 30. The handle 27 for controlling rotations of the transmission system 26 is mounted within the transparent cover 16 at a position adjacent the seat 14.

Means is provided for controlling horizontal longitudinal adjustments of the motor 23 in all vertically adjusted positions of the motor 23. This means comprises a horizontal screw 33 rotatively supported between the vertical walls 20 and threadedly passing through a bottom lug 34 formed on the bottom of the motor casing 23. An extended end of the shaft 33 is provided with a sproket wheel 35 over which an endless chain 36 extends. The opposite side of the chain 36 engages over a second sprocket wheel 37 arranged fixedly with a rotative handle 38. The handle 38 may be turned in one direction or the other to turn the screw 33. Since the lugs 22 support the motor 23 upon the walls 20 rotations of the screw 33 in one direction of the other will cause the motor to be shifted forwards and rearwards of the helicopter.

A means is provided for taking up the slack in the chain 36 in the various vertical adjustable positions of the motor 23 to insure operation of the chain 36 to longitudinally adjust the motor 23. This means comprises a pivotally mounted arm 39 provided on its front end with a sproket 40 which engages the inside of the chain 36. A spring 41 urges the arm 39 to cause it to pull upon the chain 30 and take up the slack as the motor 23 is adjusted vertically.

The motor 23 has a vertically extended driven shaft 42 which is connected by a universal joint 43 with the bottom end of the propeller shaft 44. The top end of the propeller shaft 44 is provided with a helicopter blade 45. At a position adjacent the top of the annular front portion 11 of the helicopter frame 10 there is provided a vertical propeller shaft bearing 46. This vertical propeller shaft bearing is in the form of a tube through which the propeller shaft vertically slidably extends. This propeller shaft bearing 46 is provided on oppositely disposed sides with trunnion elements 47 which turnably engage in openings 48 provided in a slide 49. This pivotal mounting of the bearing 46 permits the bearing to pivot forwards and rearwards as the motor 23 is moved forwards and rearwards. The slidable extension of the propeller shaft 44 through the bearing 46 permits sliding of the propeller shaft 44 as the motor 23 is moved vertically. It will be understood that the universal joint plus the support for the propeller shaft permits the propeller to be adjusted to a forwardly inclined position as the motor 23 is raised and moved rearwards. This angular forward inclination of the propeller permits rotations of the propeller to be used to create a forward thrust and move the helicopter forwards.

Means is also provided for shifting a position of the propeller independently of movements of the motor 23. To accomplish this the member 49 is forwardly and rearwardly slidably mounted in a frame 50 mounted upon the top of the front portion 11 of the helicopter frame 10. The member 49 is formed with a rack 51 engaged by a rotative worm 52 for moving the slide 49 forwards and rearwards and for holding it in desired adjusted positions. The worm pinion 52 is fixedly mounted on a rotative shaft 53 provided on one end of a sprocket 54. A chain 55 engages over the sproket 54 and extends into the transparent cover 16 and engages over the second sproket 56 controlled by a rotative handle 57 for rotating the shaft 53 in one direction or the other. Rotations of the shaft 52 in one direction or the other will cause the top portion of the propeller shaft 44 to pivot forwards and rearwards about the universal joint 43 to vary the angular position of the propeller. This permits the propeller to be shifted into a forwardly inclined position to drive the helicopter forwards independently of the motor adjustments.

In the modified form of the invention disclosed in Fig. 8 a propeller 17' is provided at the rear ends of the side arms 12 of the helicopter and is adapted to be driven by an electric motor 60 for assisting the propeller blade 45 when inclined forwards in pushing the helicopter in a forward direction. The propeller 17' is designed to increase the forward thrust of the helicopter.

In other respects this form of the invention is similar to that previously shown and like reference numerals identify like parts in each of the several views.

Means is also provided for changing the angle of the steering propeller 17. This means includes a rudder-like arm 17$^a$ which may be moved right or left by a cable or the like 17$^b$. The propeller 17 may also be moved up and down on the horizontal trunnion 17$^c$ by the cable or the like 17$^d$ which engages around a pulley 17$^e$ mounted on one end of the trunnion 17$^c$.

It now becomes apparent that the provision of means for shifting the engine 23 both vertically and horizontally effects a stabilization of the helicopter for various flight conditions through the variation of its center of gravity. Also it will be noted that this shifting does not affect the transmission of power to the lifting propeller.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A helicopter, comprising a frame having an annular front portion with rearwardly extending side arms, an engine support frame vertically adjustably mounted beneath and to the back of said annular front portion, an engine horizontally longitudinally adjustably mounted on said support frame and having a vertical driven shaft, a vertical propeller shaft bearing located above said driven shaft, a bearing support horizontally longitudinally adjustably mounted on the top of said annular front portion and pivotally supporting said bearing, a propeller shaft slidably mounted through said bearing and provided with a helicopter blade, and a universal joint connecting said propeller shaft with said driven shaft, said engine support frame being characterized by a pair of spaced vertical walls between which said engine is horizontally slidably mounted, and means for raising and lowering said vertical walls together with said engine, whereby to permit shifting of the center of gravity of the helicopter for control purposes and without impeding the adjustability of the propeller shaft mounting.

2. A helicopter, comprising a frame having an annular front portion with rearwardly extending side arms, an engine support frame vertically adjustably mounted beneath and to the back of said annular front portion, an engine horizontally longitudinally adjustably mounted on said support frame and having a vertical driven shaft, a vertical propeller shaft bearing located above said driven shaft, a bearing support horizontally longitudinally adjustably mounted on the top of said annular front portion and pivotally supporting said bearing, a propeller shaft slidably mounted through said bearing and provided with a helicopter blade, and a universal joint connecting said propeller shaft with said driven shaft, said engine support frame being characterized by a pair of spaced vertical walls between which said engine is horizontally slidably mounted, and means for raising and lowering said vertical walls together with said engine, whereby to permit shifting of the center of gravity of the helicopter for control purposes and without impeding the adjustability of the propeller shaft mounting, said latter mentioned means comprising vertical rotative screws threadedly engaging said vertical walls, and a transmission for turning said screw in one direction or the other.

3. A helicopter, comprising a frame having an annular front portion with rearwardly extending side arms, an engine support frame vertically adjustably mounted beneath and to the back of said annular front portion, an engine horizontally longitudinally adjustably mounted on said support frame and having a vertical driven shaft, a vertical propeller shaft bearing located above said driven shaft, a bearing support horizontally longitudinally adjustably mounted on the top of said annular front portion and pivotally supporting said bearing, a propeller shaft slidably mounted through said bearing and provided with a helicopter blade, and a universal joint connecting said propeller shaft with said driven shaft, said engine support frame being characterized by a pair of spaced vertical walls between which said engine is horizontally slidably mounted, and means for raising and lowering said vertical walls together with said engine, whereby to permit shifting of the center of gravity of the helicopter for control purposes and without impeding the adjustability of the propeller shaft mounting, said vertical walls supporting a rotative horizontal screw threadedly engaging a lug extending from said engine, and means for rotating said screw in one direction or the other and comprising the horizontal longitudinal adjustment of said engine.

4. A helicopter, comprising a frame having an annular front portion with rearwardly extending side arms, an engine support frame vertically adjustably mounted beneath and to the back of said annular front portion, an engine horizontally longitudinally adjustably mounted on said support frame and having a vertical driven shaft, a vertical propeller shaft bearing located above said driven shaft, a bearing support horizontally longitudinally adjustably mounted on the top of said annular front portion and pivotally supporting said bearing, a propeller shaft slidably mounted through said bearing and provided with a helicopter blade, and a universal joint connecting said propeller shaft with said driven shaft, whereby adjustment of said engine shifts the center of gravity of the helicopter for control purposes and without impeding the adjustability of the propeller shaft mounting.

MAURICE SWAAB.

REFERENCES CITED

The following references are of record in the file of this patent:

UNITED STATES PATENTS

| Number | Name | Date |
|---|---|---|
| 1,035,583 | Hamilton | Aug. 13, 1912 |
| 2,004,310 | Clausen | July 11, 1935 |
| 2,135,073 | Gerhardt | Nov. 1, 1938 |
| 2,378,617 | Burke | July 19, 1945 |

FOREIGN PATENTS

| Number | Country | Date |
|---|---|---|
| 11,982 | Great Britain | 1912 |
| 76,315 | Germany | July 14, 1894 |